Jan. 27, 1959 — D. A. VINCENT — 2,870,491
HORIZONTAL SILO CONSTRUCTION
Filed March 27, 1957

INVENTOR.
DAVID A. VINCENT
BY
Williamson, Schroeder, Adams & Meyers
ATTORNEYS

United States Patent Office 2,870,491
Patented Jan. 27, 1959

2,870,491

HORIZONTAL SILO CONSTRUCTION

David A. Vincent, Wilton, Minn.

Application March 27, 1957, Serial No. 648,807

5 Claims. (Cl. 20—1.4)

This invention relates to silos, and more particularly to a horizontal silo which is adapted to include a portion of ground area in its construction.

Ensilage is a partially fermented stock food produced from grain fodder such as corn stalks and the like. The product must be cut and compacted in a bulk mass to minimize destructive action thereon by air. The fermenting process produces juices which act as a preservative for the remainder of the product without destroying the value thereof as an animal food.

In order to fulfill the requirement for maintaining bulk mass, silo buildings of several types have been proposed. One common form of silo is constructed adjacent the wall of a barn where connecting passageways make it possible to withdraw ensilage directly therefrom and into the barn for stock feeding. The vertical-type silo which is usually constructed adjacent a barn is the most convenient form of construction, but it also the most expensive and becomes a permanent part of the barn building which cannot be moved or relocated. The retaining portion of such conventional vertical silo structure must be carefully fabricated and utilizes little, if any, of the natural terrain except for base support.

Another type of silo construction is a deep V-shaped dug-out formed simply in the surface of a hill side with the lower end thereof tapering outwardly to form, with the hill, a natural drain. This type of natural silo construction requires a rather sharp hill confromation located conveniently for stock feeding purposes. Obviously, only a very small percentage of farms have the natural requirements which make it possible for such a dug-out type of silo to be constructed. Furthermore, the lack of supporting structure makes it possible for heavy rains or water run-off to cave in portions of the dug-out, particularly when the silo is empty. Another objection to the dug-out type is the lack of control over natural feeding unless the area in which the dug-out is formed is completely fenced in or otherwise protected against indiscriminate trampling and abuse by livestock.

A third type of storage for ensilage utilizes no external structure or natural dug-out in a hillside but consists merely of a pile of cut grain stalks and the like built directly upon the ground and compacted as it is being built by running a crawler-type tractor or similar equipment back and forth over the pile. Such simple piled mass of fodder must naturally be placed on a support having good drainage and, again, must be fenced to prevent tearing down of the structure by livestock. Since air can gain access to a large area of the pile, wastage is quite large and only the interior of the pile is suitable for feeding purposes. Furthermore, in compacting the mass with a crawler-type tractor or the like, accidents often occur when the equipment approaches side edges of the pile where it can easily tip over.

It is within the contemplation of this invention, and a general object thereof, to overcome the foregoing objections to the prior art silo devices and to provide a novel silo construction which will be inexpensive and capable of rapid building.

Another object is to provide a silo construction which may be installed on hilly ground or substantially level ground, yet can utilize certain features of a natural pit or trench formed in the ground.

A further object of the invention is to provide a horizontal silo construction, a portion of which includes the ground itself and a portion of which includes a superstructure of upstanding removable wall members.

A still further object of the invention is to provide a construction of the class described which does not require any special foundation and which can utilize a very simple anchoring system, the weight of the ensilage itself making the structure and its anchoring feature more rigid and safe.

These are other objects and advantages of the invention will more fully appear from the following description, made in connection with the accompanying drawing wherein like reference characters refer to the same parts throughout the several views and in which.

Figure 1:
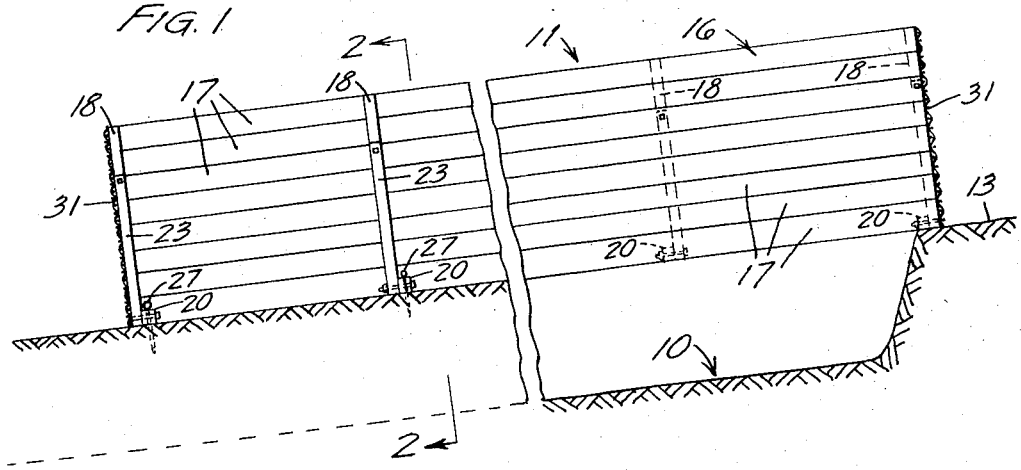
Figure 1 is a side elevation of my horizontal silo construction, intermediate portions thereof being cut away as duplicative and the upper end being shown in vertical section through the center thereof.

Referring now to the drawing, my horizontal silo comprises generally a natural bottom 10 formed in the ground itself and a superstructure indicated generally at 11.

Figure 2:
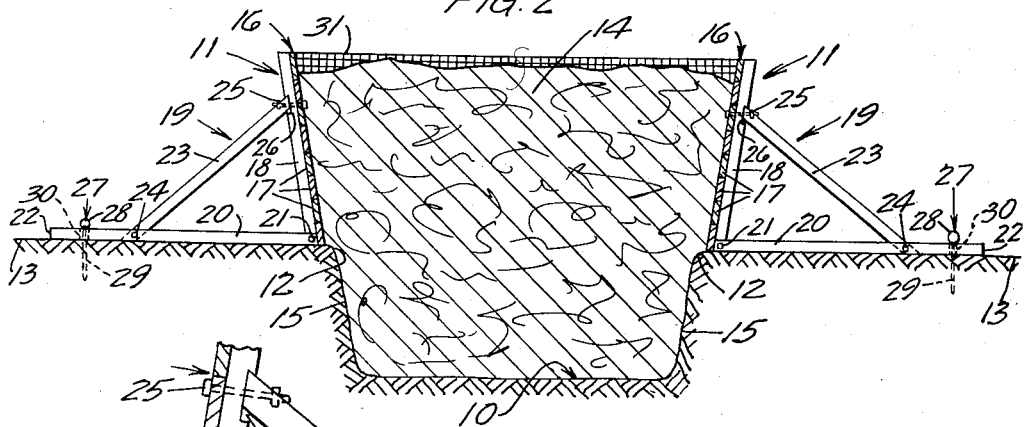
Figure 2 is a vertical section taken across my horizontal silo construction on the line 2—2 of Figure 1.

It is within the contemplation of this invention to utilize my superstructure with natural earth conformations as well as the specifically illustrated shallow pit, the natural requirements being the utilization of an area of ground defined by side edges 12 in spaced relation and plotted on the general ground surface 13, as shown in Figure 2. The bottom 10 may be formed on sloping ground as shown in Figure 1, or may be plotted on level ground with special provision (not shown) for obtaining equivalent natural drainage. For purposes of stock feeding directly from the silo itself, I may make the silo elongated with access at either or both ends or may utilize a structure less elongated in nature and provided with additional walls of a similar nature to those disclosed herein. In any event, the cooperation between the superstructure 11 and the ground surface 13 is the same as that which will be presently disclosed.

It is intended that the depth of the bottom 10 with respect to the terrain surface 13 range from the surface itself to a shallow value in contradistinction to the V-type silo construction wherein substantially all of the cross sectional area of the ensilage mass is below the ground surface. The instant invention contemplates that the major portion of the ensilage cross section be disposed at a position above the ground surface 13, as shown in Figure 2.

The superstructure is intended to be positioned peripherally of the bottom so as to form a continuous wall structure for retaining a mass of ensilage 14. Referring to Figure 2, the embankment 15 defining the side edge of the pit or trench bottom 10 is in substantial alignment with wall member 16 of the superstructure 11. The superstructure comprises a plurality of wall members 16, each in turn having a plurality of individual boards 17 secured together in a plane which is angulated slightly upwardly and rearwardly from the silo bottom 10, as shown in Figure 2. The wall 16 is tied together at spaced intervals by vertical studs 18, as shown in Figures 1 and 2. The boards 17 may be nailed or otherwise secured to the studs, forming a continuous and rigid structure.

A plurality of support members 19 are provided for each of the studs 18 and the construction thereof is important to the operation of my silo construction. The support 19 has an elongated base 20 which is bolted or otherwise secured at 21 to the lower terminus of each of the upstanding studs 18 and lies in continuous contact with the ground surface 13, thus permitting the wall 16 to contact the ground and form a substantially continuous wall with the ground bottom 10. The elongated base extends outwardly in a lateral direction from the wall 16 and terminates remotely therefrom at 22.

Figure 3:
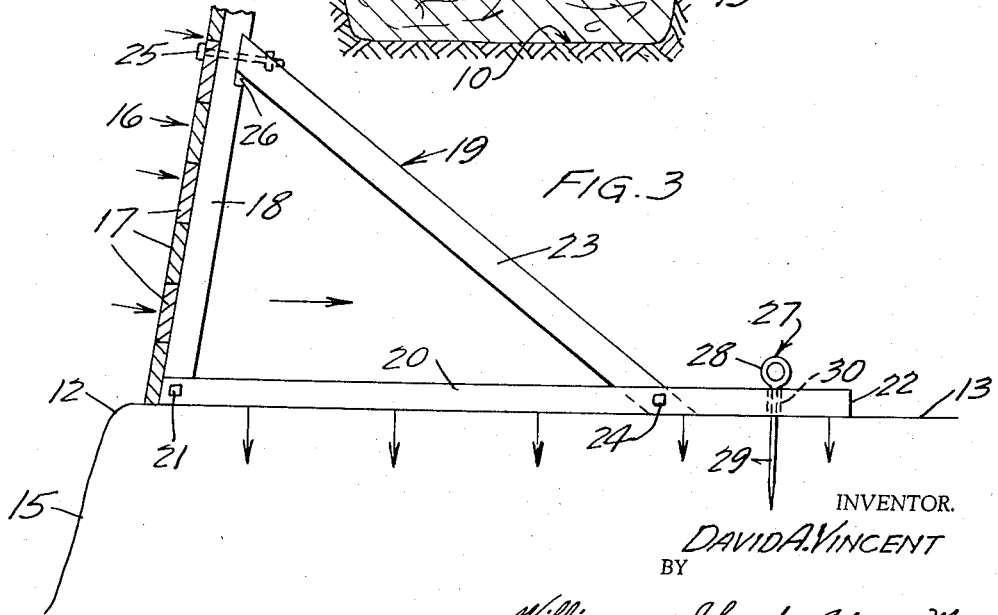
Figure 3 is an enlarged view of a portion of my support structure showing the remote anchoring means and distribution of forces on the support and wall structure.

Each of the elongated base members 21 is provided with a brace 23 which is secured as by a bolt or other fastener 24 to the elongated base at a position intermediate the ends thereof but adjacent the outward terminus 22 as shown in Figures 2 and 3. The upper end of brace 23 is secured as by bolt 25 to stud 18, the latter being notched at 26 to further rigidify the connection.

Anchoring means 27 are provided on each of the support members 19 remotely from the associated edge 12 of the bottom 10 and, in the instant disclosure, constitutes a stack having a head 28 and an elongated body portion 29, as shown. An opening 30 may be formed in the elongated base intermediate the brace connection 24 and the outer terminus 22 of the base member, as shown. With this arrangement, all of the force components exerted upon each of the wall structures is absorbed by the ground surface 13 and each of the stakes 29, and since the arrangement permits the remote positioning of the stakes 29, there is no danger of forces exerted thereon crumbling the embankment 15 or otherwise interfering with the close union between the superstructure and the bottom structure.

Referring to Figure 3, the enlarged fragmentary view of the elongated base in relation to the ground and wall structure is set forth. It will be observed that, because of the slight inclination of the wall 16, the ensilage 14 exerts both an outward and downward pressure. The horizontal component of this force is indicated by the long horizontal arrow and the vertical component is indicated by the shorter vertical arrows. There is sufficient vertical component to keep the wall 16 in contact with ground surface 13, but the force is not so great as to cause crumbling of the embankment wall 15 where the device includes a pit-type bottom. The vertical component is not only small but is also distributed along the length of the elongated base in its contact with ground 13. Since the stake 27 is remotely positioned from the embankment 15, and further since the stake can resist horizontal force to a much greater degree than a vertical force, the entire superstructure is simply and rigidly maintained in position. The weight of the ensilage 14 when the silo is filled renders the entire structure more firm and rigid than when the silo is empty. A high capacity of ensilage can be obtained without constituting a pit or dug-out of such depth as would endanger the wellbeing of livestock. It will also be observed that, if it be desired to relocate the silo, the entire operation is very simple and requires simply removing and replacing stakes 27 with the superstructures 11 moved into a new cooperative engagement with a ground bottom.

My horizontal silo structure easily adapts itself to natural feeding by placing removable barriers such as fencing 31 over the ends of the wall superstructures, as shown in Figures 1 and 2. The end barriers may be temporarily removed or partially removed to restrict and control the rate of feeding from the silo.

It will, of course, be understood that various changes may be made in the form, details, arrangement and proportions of the parts without departing from the scope of my invention.

What I claim is:

1. A horizontal silo comprising a bottom formed directly from an area of ground having spaced side edges, an upstanding wall along each of the straight side edges, said walls being angled divergently upward, support means secured in horizontally spaced relation along each of said walls and terminating laterally outward from the bottom in contact with adjacent ground surface, and anchoring means tieing the support means to the ground adjacent the outward terminii thereof whereby to resist the horizontal force component exerted upon each of said walls.

2. A horizontal silo comprising an elongated shallow trench cut in the surface of the ground and defined by a pair of side embankments, each terminating upwardly in a substantially straight edge, an upstanding wall along each of said straight edges, said walls being angled divergently upward, a plurality of supports secured in horizontally spaced relation along each of said walls and each having an elongated base terminating laterally outward from the trench in contact with adjacent ground surface and a brace connecting the elongated base and the associated wall, and anchoring means tieing the elongated base to the ground adjacent the outward terminus thereof whereby to resist the horizontal force component exerted upon each of said walls.

3. The subject matter set forth in claim 2, wherein the anchoring means consists of a single stake pinning each of the elongated base members to the ground at a position adjacent the outward terminus thereof.

4. A horizontal silo comprising and elongated shallow trench cut in the surface of the ground and defined by a pair of side embankments, each terminating upwardly in a substantially straight edge, a plurality of elongated boards forming upstanding walls at each side of said trench cut and constituting a continuation of the embankments of the trench sides, upstanding stud members securing the board members together at horizontally spaced intervals along each of said walls, an elongated base secured to each of the studs and adapted to contact the ground outwardly from the sides of said trench, a brace member interconnecting each of the stud members at a position in spaced relation with the ground surface and extending downwardly and rearwardly to rigid interconnection with said elongated base adjacent the outer terminus thereof, and anchoring means disposed between said brace and the outer terminus of the base for tieing each of the elongated base members to the ground surface at a position remote from the trench cut whereby to resist the horizontal force component exerted upon each of said walls.

5. In a shallow pit silo, a wall structure adapted to be braced at each side edge thereof comprising an upstading wall in longitudinal contact with the ground adjacent the shallow pit and angulated slightly outward therefrom, and a plurality of supports secured to said wall structure in horizontally spaced relation therealong and each having an elongated base secured to the wall structure and continuously contacting the ground surface outwardly from the shallow pit and each further having a brace member secured intermediate the ends of the elongated base and extending upwardly to rigid interconnection with the wall structure, and anchoring means for each of the elongated base members securing the same to the ground at a remote position from the shallow pit and between the brace member and the outer terminus thereof, the anchoring means providing the wall means for resisting the horizontal force component against the wall structure and the vertical component being resisted by simple pressure against the ground in distributed relation along the elongated base whereby to minimize cave-in of the ground structure adjacent the silo pit.

References Cited in the file of this patent

UNITED STATES PATENTS

| | | |
|---|---|---|
| 26,481 | Doyere | Dec. 20, 1859 |
| 1,178,641 | Henkel | Apr. 11, 1916 |
| 2,330,642 | Tuttle | Sept. 28, 1943 |
| 2,601,608 | Hansen | June 24, 1952 |